(12) United States Patent
Ferme et al.

(10) Patent No.: US 7,377,659 B2
(45) Date of Patent: May 27, 2008

(54) DEFORMABLE SYSTEM COMPRISING A PARALLELEPIPED-SHAPED PART AND AN ACTUATOR

(75) Inventors: Jean-Jacques Ferme, Velaux (FR); Jean-François Carre, Pertuis (FR)

(73) Assignee: Societe Europeenne de Systemes Optiques (FR)

( * ) Notice: Subject to any disclaimer, the term of this patent is extended or adjusted under 35 U.S.C. 154(b) by 318 days.

(21) Appl. No.: 10/537,655

(22) PCT Filed: Jan. 14, 2004

(86) PCT No.: PCT/FR2004/000056

§ 371 (c)(1),
(2), (4) Date: Jun. 6, 2005

(87) PCT Pub. No.: WO2004/072986

PCT Pub. Date: Aug. 26, 2004

(65) Prior Publication Data

US 2006/0056087 A1    Mar. 16, 2006

(30) Foreign Application Priority Data

Jan. 17, 2003    (FR) .................................. 03 00513

(51) Int. Cl.
*G02B 5/08* (2006.01)

(52) U.S. Cl. .................... 359/849; 359/224; 359/291
(58) Field of Classification Search ............... 359/849, 359/224, 290, 291, 872
See application file for complete search history.

(56) References Cited

U.S. PATENT DOCUMENTS 5,887,048 A    3/1999    Sata et al.
6,715,892 B1 *  4/2004    Carre et al. ............... 359/846

FOREIGN PATENT DOCUMENTS

EP    1 016 890 A    7/2000
FR    2 703 777 A    10/1994
GB    972 992 A    10/1964

* cited by examiner

*Primary Examiner*—Euncha P Cherry
(74) *Attorney, Agent, or Firm*—Alston & Bird LLP

(57) ABSTRACT

The invention relates to a deformable system comprising a part of a rectangular block shape, such as a beam, coupled to an actuator enabling the part to be deformed by generating curvature in the length direction, the system being characterized in that said part presents a main portion to be deformed, which main portion carries projections at its ends such that, in longitudinal section, the part presents an elongate U-shape, and in that the actuator presents levers coming to bear against said projections in order to transmit thereto a force suitable for producing deformation of the part.

10 Claims, 5 Drawing Sheets

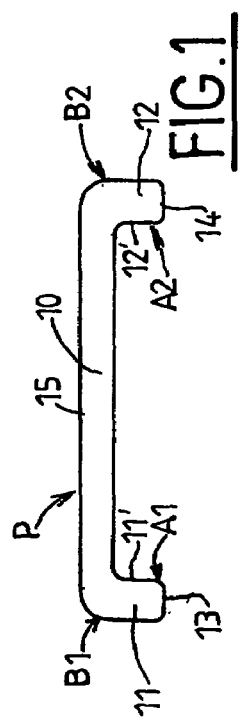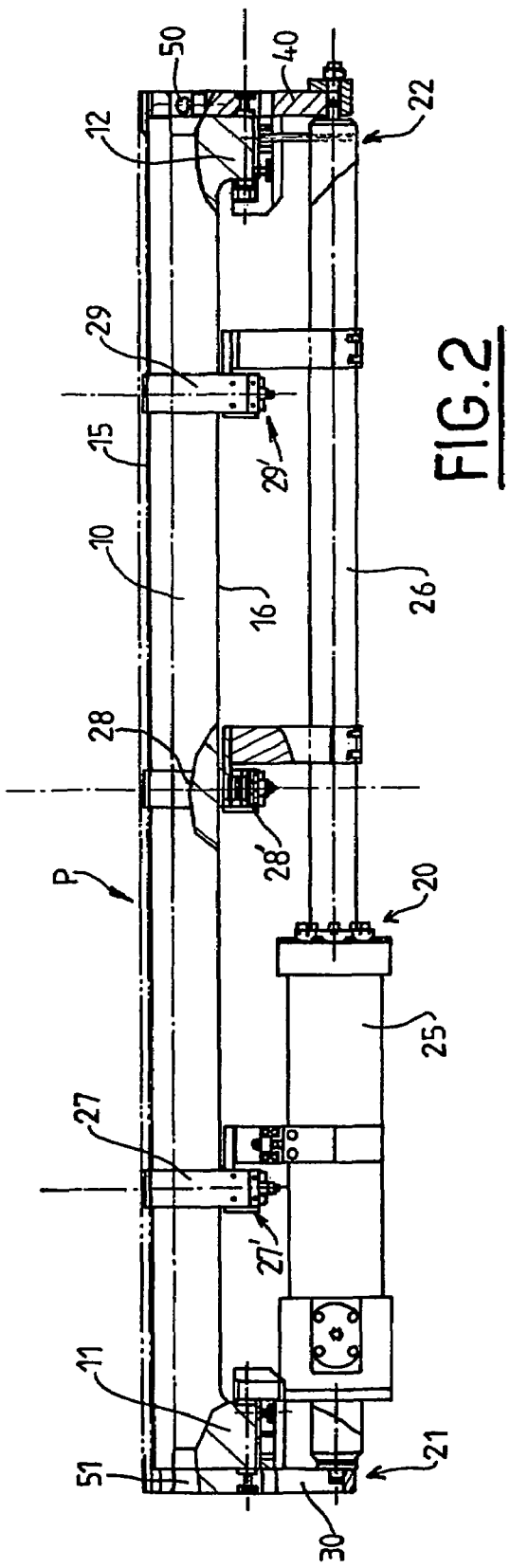

DEFORMABLE SYSTEM COMPRISING A PARALLELEPIPED-SHAPED PART AND AN ACTUATOR

FIELD AND BACKGROUND OF THE INVENTION

The present invention relates to a deformable system comprising a part in the form of a rectangular block coupled to an actuator enabling it to be deformed to generate curvature in the long direction of the part.

Mirrors are already known for use around synchrotrons in which varying curvature makes it possible to change the focus of a beam of X-rays.

SUMMARY OF THE INVENTION

The present invention relates to a system enabling such a part to be deformed, and is based on the idea of using the part, e.g. a mirror, as a supporting structure. To this end, instead of being in the form of a rectangular parallelepiped, the part is more complex in shape since it has projections at its ends enabling deforming forces to be transmitted to the part.

The invention thus provides a deformable system comprising a part generally in the shape of a rectangular block, such as a beam, coupled to an actuator enabling the part to be deformed by generating curvature in its long direction, the system being characterized in that said part, in particular a mirror, presents a main portion to be deformed, the main portion carrying projections at its ends such that, in longitudinal section, the part presents an elongate U-shape, and in that the actuator presents levers each presenting at least one bearing point for acting on said projections in order to transmit a force thereto in such a manner as to deform the part.

The device may be characterized in that each lever presents at least one bearing point constituted by at least one rigid plane part, said plane part co-operating with at least one ball for transmitting the force that is to be applied.

At least one said ball may be centered by spring blades distributed around its periphery.

The device may be characterized in that at least one lever presents a first bearing point disposed in an outside portion of the part, advantageously in line with the central portion and preferably adjacent to the face of the main portion that is opposite from said projections, and a second bearing point spaced apart from the first bearing point towards a free end of said projection and disposed on an inside portion of said projection.

The first and/or second bearing point may comprise two of said rigid plane parts. In which case, the first and/or second bearing point may comprise a rocker covering said two rigid plane parts.

BRIEF DESCRIPTION OF THE DRAWINGS

Other characteristics and advantages of the invention appear on reading the following description given reference to the accompanying drawings, in which:

FIG. 1 shows the basic principle of the invention;
FIG. 2 is a side view of a device of the invention;

DETAILED DESCRIPTION OF THE INVENTION

Figure 3A:
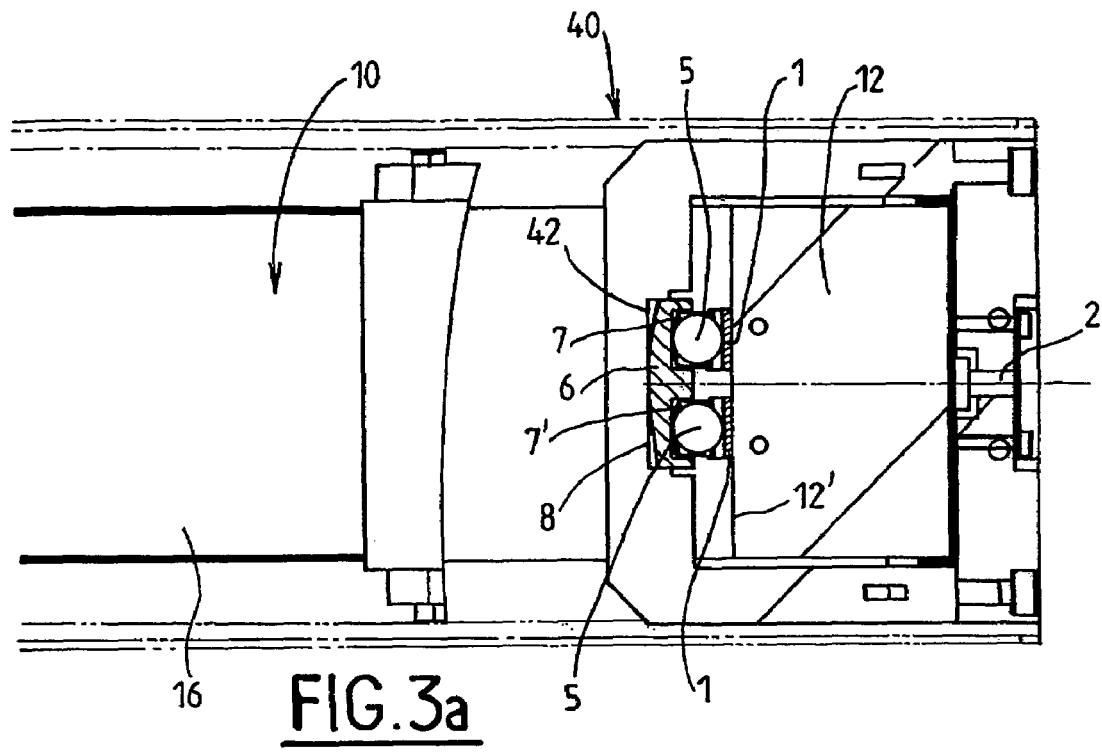
FIGS. 3a and 3b are views from beneath and partially in section on AA and BB showing respectively the configuration of an inside bearing point and of an outside bearing point.

The part P to be deformed and shown in FIG. 1 presents a central portion 10 in the shape of a rectangular block to be deformed extending between two main and generally plane surfaces 16 and 17 with two extensions 11 and 12 at its ends, these extensions 11 and 12 preferably extending perpendicularly to the plane of the central portion 10. The projections 11 and 12 give the part an elongate U-shape when seen in section. These projections are relatively solid so that they deform only negligibly when a force is applied thereto in order to deform the central region 10.

The part P, in particular a mirror, is preferably machined from a single block of material, e.g. of Si, $SiO_2$, SiC, Zerodur (trademark in the name of Schott), ULE (trademark in the name of Corning), or any other material of glass or crystal type.

The part P is deformed by levers acting on the projections 11 and 12 via bearing points A1 and B1 for the projection 11 and bearing points A2 and B2 for the projection 12 (FIG. 1). The bearing points A1 and A2 are positioned in the inside portions 11' and 12' of the projections 11 and 12, preferably in the immediate vicinity of their free ends 13 and 14. The bearing points B1 and B2 are disposed on the outside of the part P, advantageously in line with the central portion 10, and preferably as close as possible to the face 15 to the part P that is opposite from the projections 11 and 12.

In order to curve the main portion 10 of the part P, moment type forces are transmitted to the two ends of the part. To this end, it is appropriate to fix a lever to each end. An actuator 20 such as a hydraulic cylinder (FIG. 2) presenting a cylinder 25 and a rod 26 serves to exert thrust on the levers.

The assembly described below allows two levers to be associated with the part P. One of the features of this configuration is that, given that the rectangular block 10 is made of a material that is generally brittle when it constitutes the mirror, it enables large forces to be transmitted thereto by achieving good control over pressures at the points where said forces are applied, and does so without requiring very high precision machining.

In addition, the movements induced by temperature variations can take place without slip and without any increase in force (which is important when it is not possible to grease a mechanism due to the conditions under which it works) because of the following:

a) the bearing points on the rectangular block are constituted by plane pallets 1 of hard metal which receive the force via balls 5 pressing against the centers of the pellets 1, which pellets then serve to distribute the pressure delivered by the balls; and b) cylindrical spring blades 7 distributed around the balls keep the balls 5 centered on the plane pellets 1 while allowing small displacements parallel to the bearing plane.

Mounting fixed bearing points via spring blades 7 enables them to rock while maintaining a uniform bearing force so as to transmit the pressures and forces from the actuator 20 and distribute them over the bearing zones.

It is preferable to use a pair of ball systems 1, 5 for each bearing point A1, A2, B1, and B2. This disposition is shown in the section views of FIGS. 3a and 3b.

In addition, for the inside bearing points A1 and A2 (see FIG. 3a), it is advantageous to use an additional part 6 which covers the two balls 5 via housings 7 and 7' and which presents a region 8 of spherical outline enabling it to rock in co-operation with a plane face 32 of the lever 30. This additional rocking movement 6 operating like a rocker bar serves to distribute pressure uniformly between the two bearing points provided by the two balls 5, and thus to obtain deformation that is well-distributed over the width of the main region 10 that is to be curved. It will be understood that the other bearing points B1 and B2 do not produce any deformation of the extensions 11 and 12, but serve above all to act as reference points for the lever, e.g. at the ends of the region 10 (in particular level with the neutral fiber of said region), and can therefore be implemented without a rocking connection 6.

Figure 3B:
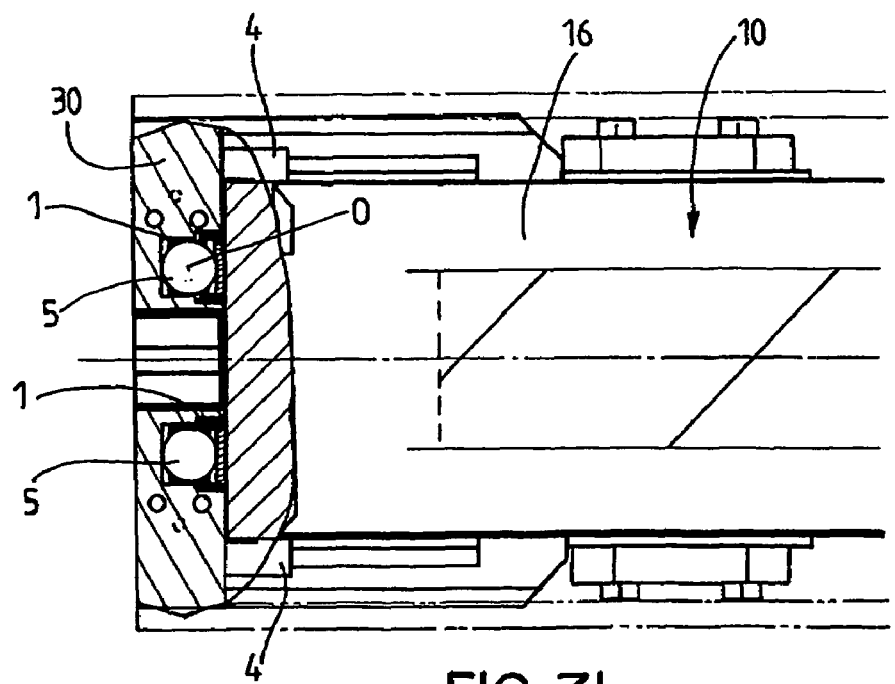
Figure 4A:
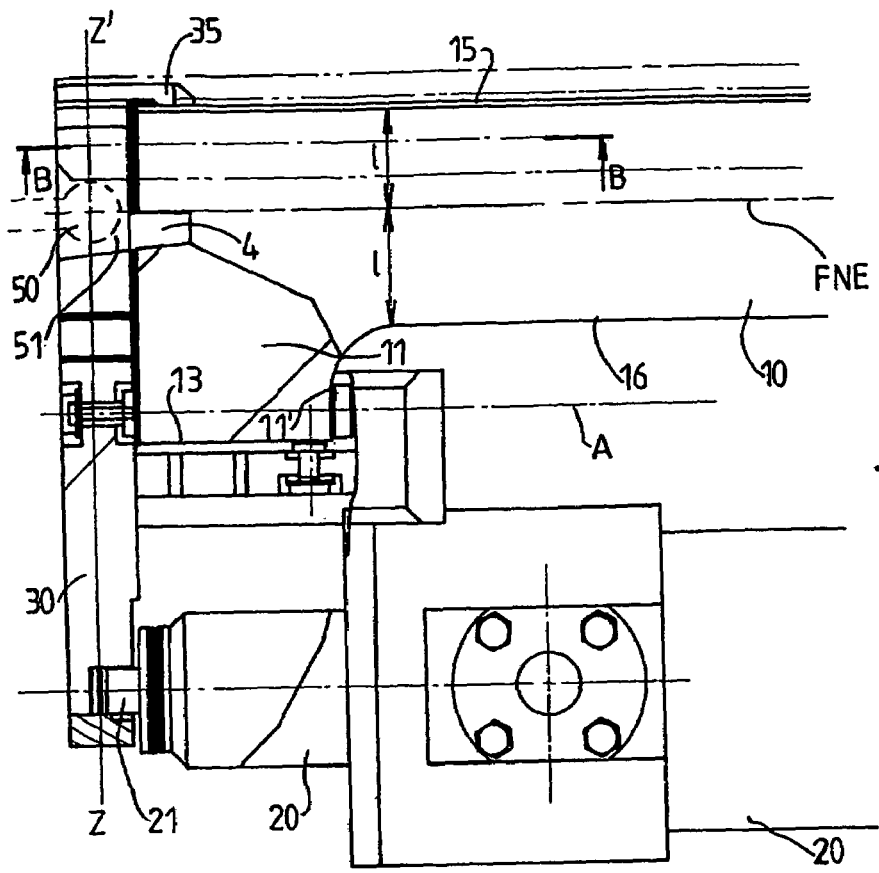
FIGS. 4a and 4b are views on a larger scale showing the longitudinal ends of the FIG. 2 device.
Figure 4B:
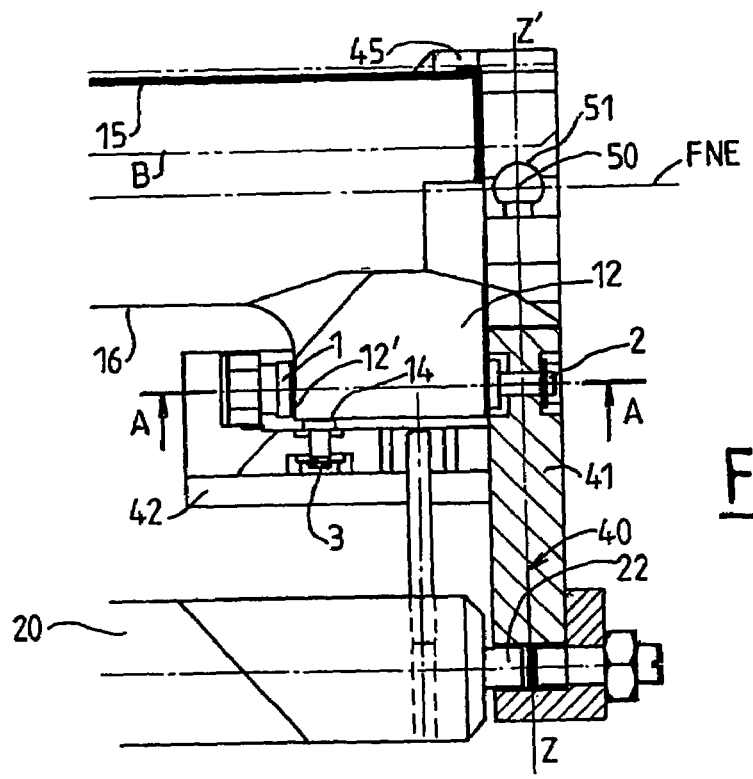

Lateral movement of the part 10 relative to the levers 30 and 40 is prevented by two parts 4 extending from the lever 30 parallel to the longitudinal direction of the part P and bearing simply against the side edges of the region 10 (see FIGS. 3b and 4a).

Each of the levers 30 and 40 comprises a main arm (31, 41) running along a plane longitudinal end of the part 4 and carrying the outside bearing points B1 and B2, and a plate (41, 42) carrying the inside bearing points A1 and A2.

The levers are held pressed against the part 10 firstly by the spring 2 secured to the plate 41 which holds the lever 40 pressed against the parts 1 (FIG. 3a) and by the spring 3 secured to the plate 42 of the lever 40 and which holds it pressed via an end tab 45 (and/or 35) of the arm 41 (and/or 31).

The actuator 20 which is embedded at 21 and 22 between the two levers 30 and 40 acts to urge the two levers 30 and 40 apart, and it can be seen that the assembly is properly referenced in three dimensions.

In order to minimize deformation of the part P when it is desired to support the assembly constituted by the part P, the actuator 20, and the levers 30 and 40, an isostatic interface is used that is situated in the plane of the neutral fiber FNE of the central region 10 of the part P.

This is represented in the drawings by three bearing points 50:

two on one of the levers (e.g. 40, see FIG. 4d); and one on the other lever (e.g. 30, see FIG. 4a).

The device shown in the drawings enables the assembly to be supported in a position in which the extensions 11 and 12 are directed upwards, but this is merely an example and the design is equally applicable to extensions 11 and 12 that extend downwards.

The contacts implemented by the bearing points (or the corresponding center bearing point which is the center of the sphere when using a spherical bead 50) are situated in the plane of the neutral fiber FNE of the main portion 10 of the part P, the neutral fiber FNE passing through the middle of the region 10.

Figure 4C:
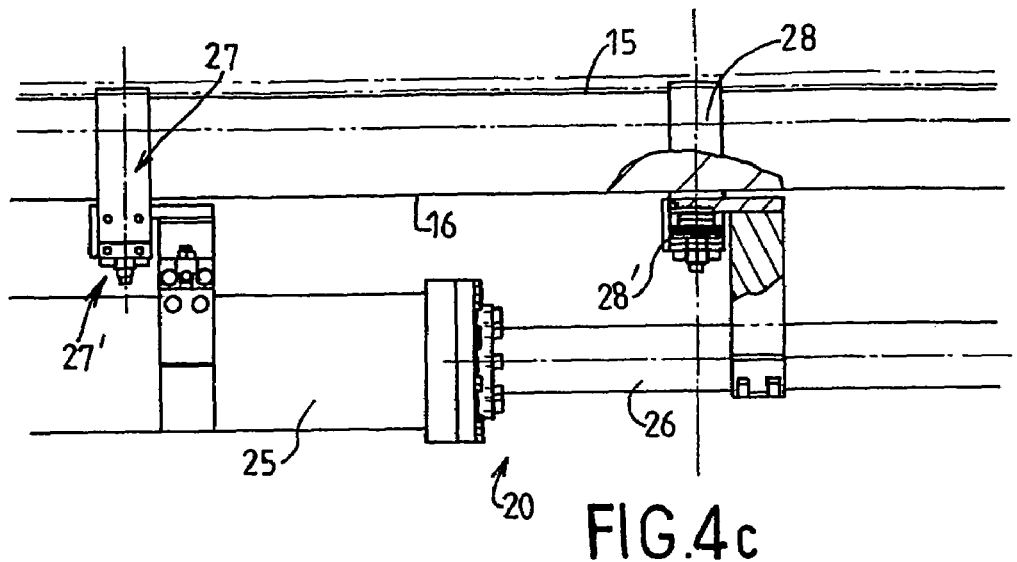
FIG. 4c is a view on a larger scale showing the central portion of FIG. 2.
Figure 4D:
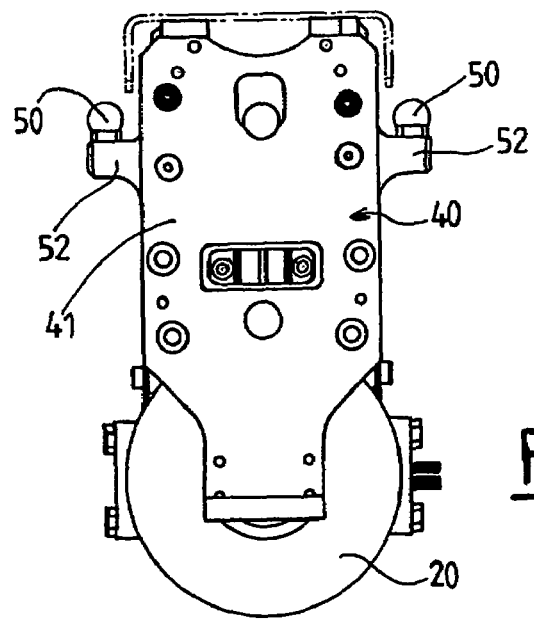
FIG. 4d is an end view of FIG. 2.
Figure 5:
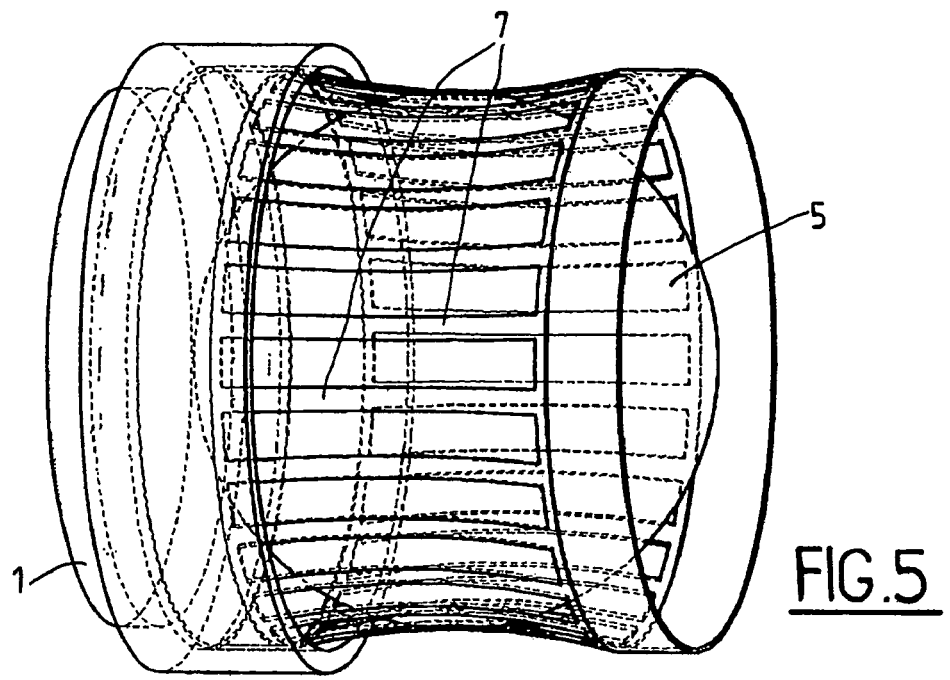
FIG. 5 shows a preferred embodiment of a ball-centering device.

In the preferred situation, two balls 50 are thus placed on side arms 52 of one of the levers (e.g. 40, FIG. 4d). A hole 51 serving to interface with the other ball 50 is formed on the other lever (e.g. 30, FIG. 4a).

The positions of the centers 0 of these balls 50 along the length of the region 10 advantageously pass via a plane ZZ' perpendicular to the long direction and passing via the points 21 and 22 where the actuator 20 bears against the levers 30 and 40, thus making it possible to ensure that the mass of the actuator does not introduce any moment in the levers 30 and 40, and thus does not introduce any variation in curvature.

In order to limit deformation due to gravity, compensation via bearing points (or retaining means depending on the orientation of the part) can be secured between the actuator 20 and the part P, and they are adjusted to minimize the sag of the part due to gravity. An example application consists in using springs to perform this function, as shown in FIGS. 2 and 4c where there can be seen compensators 27, 28, and 29 between the central portion 10 of the part P and the cylinder 25 or the rod 26 of the actuator 20, together with compensation springs 27', 28', and 29'.

Figure 6:
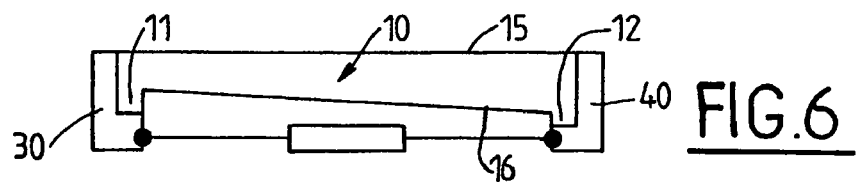
FIGS. 6, 7a, 7b, and 8 show various embodiments of the invention.

In a variant (FIG. 6), the thickness of the region 10 may vary with a relationship that makes it possible, when moments are applied, to obtain a shape other than a shape having a cylindrical profile that is symmetrical about the middle of the length of the mirror: e.g. shape that is elliptical, parabolic, or polynomial in section without any axis of symmetry.

Figures 7A, 7B:
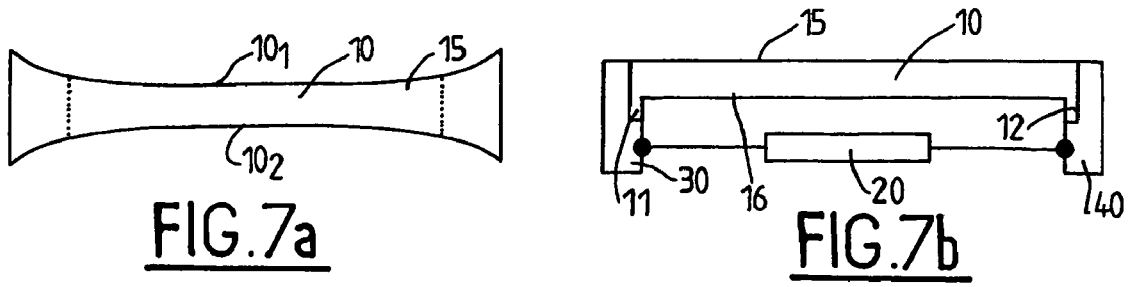

In another variant of the invention (FIGS. 7a and 7b), the above effect is obtained by modifying the width of the part (FIG. 7a) along its length (a curvilinear rectangular block), using a relationship of the linear type or possessing polynomial terms of higher order. Under such circumstances, symmetry is conserved for the two lateral profiles $10_1$ and $10_2$ relative to the length of the mirror.

Figure 8:
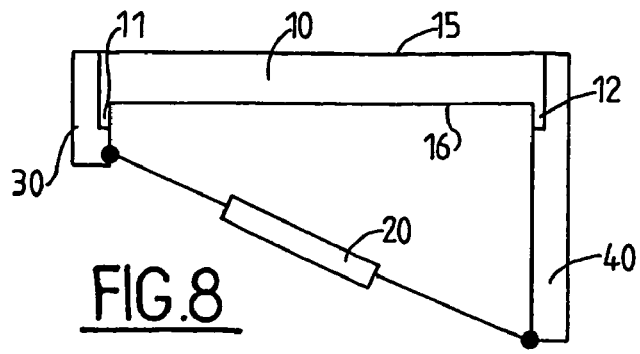

In another variant of the invention, the above effect is obtained by changing the lengths of the levers 30 and 40 (FIG. 8).

Any combination of these variants is also possible.

The invention claimed is:

1. A deformable system comprising a part generally in the shape of a rectangular block coupled to an actuator enabling the part to be deformed by generating curvature in its long direction, wherein said part presents a main portion to be deformed, the main portion carrying projections at its ends, each projection extending in a direction transverse to said long direction between an end of said part and a free end of said projection such that, in longitudinal section, the part presents an elongate U-shape, and wherein the actuator presents levers, each lever presenting two bearing points that are spaced apart along the transverse direction of a projection, namely a first outside bearing point and a second bearing point disposed on an inside portion of said projection, so that each lever acts on said projections in order to transmit a lever force thereto in such a manner as to deform the part.

2. A system according to claim 1, wherein each lever presents at least one said bearing point constituted by at least one rigid plane part, said plane part co-operating with at least one ball for transmitting the force that is to be applied.

3. A system according to claim 2, wherein at least one ball is centered by spring blades distributed around its periphery.

4. A system according to claim 1, wherein said second bearing point is spaced apart from the first bearing point towards a free end of said projection.

5. A system according to claim 4, wherein the first bearing point is adjacent to the face of the main portion of the part that is opposite from said projections.

6. A system according to claim 2, wherein the first and/or second bearing point comprises two of said rigid plane parts.

7. A system according to claim 6, wherein the first and/or second bearing point comprises a rocker covering said two rigid plane parts.

8. A system according to claim 1, wherein it presents an isostatic support interface situated in the plane of the neutral fiber of the central region of the part.

9. A system according to claim 1, wherein said part comprises a mirror.

10. A system according to claim 9, wherein said mirror is in the shape of a beam.

* * * * *